No. 753,278. PATENTED MAR. 1, 1904.
F. J. LINDEMAN.
WINDING FOR ELECTRICAL MACHINES.
APPLICATION FILED APR. 11, 1903.
NO MODEL.
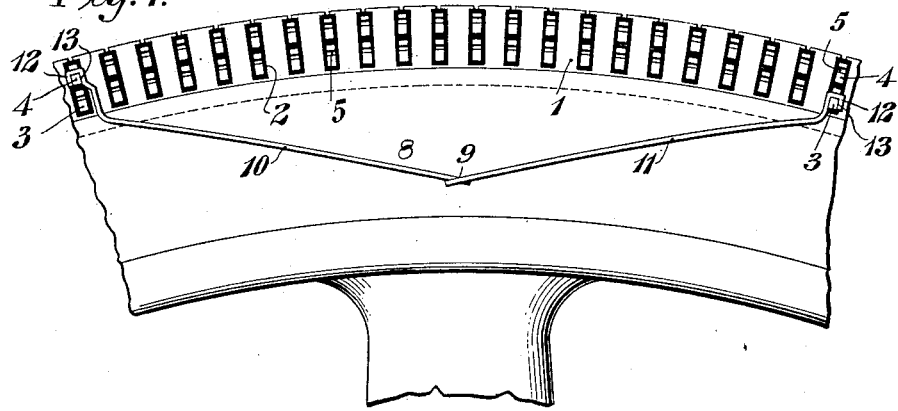
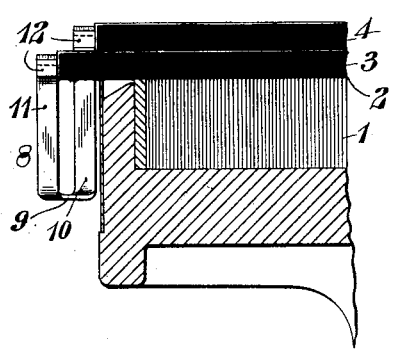
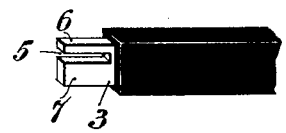
WITNESSES:
C. L. Belcher
Birney Hines
INVENTOR
F. J. Lindeman
BY
Wesley G. Carr
ATTORNEY.

No. 753,278.  
Patented March 1, 1904.

UNITED STATES PATENT OFFICE.

FREDERICK J. LINDEMAN, OF PITTSBURG, PENNSYLVANIA, ASSIGNOR TO WESTINGHOUSE ELECTRIC & MANUFACTURING COMPANY, A CORPORATION OF PENNSYLVANIA.

WINDING FOR ELECTRICAL MACHINES.

SPECIFICATION forming part of Letters Patent No. 753,278, dated March 1, 1904.

Application filed April 11, 1903. Serial No. 152,278. (No model.)

*To all whom it may concern:*

Be it known that I, FREDERICK J. LINDEMAN, a citizen of the United States, and a resident of Pittsburg, in the county of Allegheny and State of Pennsylvania, have invented a new and useful Improvement in Windings for Electrical Machines, of which the following is a specification.

My invention relates to electrical machines, and particularly to bar-windings for such machines.

The object of my invention is to provide a winding comprising bars and end connectors which may be readily and inexpensively assembled and so fastened together as to be substantially free from danger of rupture and disarrangement in service.

It is a well-known practice in the manufacture of certain types and kinds of electrical machines the windings of which are required to carry heavy currents to locate in each of the core-slots one or more copper bars of rectangular cross-section and connect the ends of the bars which project beyond the ends of the core by means of strap-connectors of such length and form as to provide the desired arrangement of circuits and be so located with reference to each other as to avoid mechanical interference. It has been the usual practice heretofore in connection with windings of this character to fasten the ends of the end-connectors to the ends of the proper bar-conductors by means of bolts and nuts and to subsequently solder the joints thus formed between the said parts. This construction involved the expenditure of a considerable amount of time and labor in boring the parts to receive the bolts and in subsequently applying the bolts and nuts. The possibility that the nuts would work loose in service was also a matter of some consequence.

By my present invention I am enabled to employ a minimum number of parts, to readily assemble them together, and to so fasten them in position that they are practically free from all danger of disarrangement in service.

My invention is illustrated in the accompanying drawings, in which—

Figure 1 is an end elevation of a portion of one of the members of an electrical machine, showing certain of the bar-conductors and one of the end-connectors in position. Fig. 2 is a sectional view of a portion of one of the members of an electrical machine, showing portions of two bars and two end-connectors in side elevation. Fig. 3 is a plan view of one of the end-connectors, and Fig. 4 is a perspective view of one end of one of the bar-conductors.

It will of course be understood that my invention may be utilized in connection with the windings of either rotating or stationary members of machines and irrespective of the specific service to which the machine is to be applied.

As here indicated, the invention is shown as applied to the rotating member of a machine the core 1 of which is provided with slots which may be either open, closed, or partially closed at the periphery of the core and be of such dimensions as to receive the number and size of bars which may afford the service for which the machine is designed. As here indicated, each slot 2 contains two bars 3 and 4, the former of which projects a greater distance than the latter beyond the end of the core in order to accommodate the end-connectors hereinafter described. The projecting end of each of the bars 3 and 4 is provided with a transverse slot 5, and it is of course to be understood that the projecting ends of the bars at the opposite end of the core (not shown) are provided with similar slots. As indicated, each slot is so located in the end of the bar that the outer portion 6 is of less thickness than the inner portion 7, for a reason to be hereinafter specified, though the slot may be otherwise located, if desired.

The end-connector 8 may have any one of a variety of forms, so far as the body portion is concerned; but I have here shown a practical and convenient form, in which such body portion is of approximately V shape in end elevation and embodies an offset 9 at approximately its middle point, so that the two parts 10 and 11 at the sides of this offset are in substantially parallel planes. The end of each of the parts 10 and 11 is bent into the form of a substantially rectangular hook 12, the length of which is substantially equal to the thickness of the bar to which it is to be connected and the ends of which are substantially at right angles to such portion in order to closely fit the edges of the bar. The location of the slot nearer to one side than the other of the bar insures a large contact area between the end portions of the hook and the bar; but, as before suggested, the slot may be otherwise located, if desired, without materially affecting the scope of the invention. After placing the connector 8 in position, as indicated in Fig. 1, the engaging parts may be soldered, as indicated at 13, and any insulation applied which may be desired in addition to that with which the bars and end-conductors are provided before assembling.

It will be seen from the illustration and foregoing description that the invention insures an inexpensive and desirable construction by reason of the minimum number of parts employed, the means whereby said parts are connected, and the facility with which they may be assembled and fastened in position.

Minor variations in form, dimensions, and relative location of parts which do not change the mode of operation and result are within the scope of my invention and are intended to be covered by the claims.

I claim as my invention—

1. In an electrical machine, the combination with a slotted core, of conducting-bars located in the core-slots and having projecting ends provided with slots that are transversely disposed with reference to the corresponding core radii and connectors having their ends seated in said bar-slots and soldered in position.

2. In an electrical machine having a slotted core, a winding comprising conducting-bars located in the core-slots and having slotted ends and strap-connectors having their ends bent into hook form and fitted into the slots in the ends of the bars.

3. In a winding for electrical machines, conducting-bars having slotted ends and strap-connectors having their ends bent to form hooks which fit into said slots and partially surround the adjacent portion of the bar.

4. In a winding for electrical machines, conducting-bars having slotted ends and strap-connectors having their ends located in said slots and bent adjacent thereto to engage the adjacent portions of the bars and solder for holding said parts together.

5. In an electrical machine, a slotted core having a winding comprising conducting-bars located in the core-slots and end-connectors having their ends bent to form hooks which grip the ends of the conductor-bars and solder for uniting said parts.

6. In an electrical machine, a slotted core having a winding comprising conductor-bars located in the core-slots and having slots in their ends and strap-connectors having their ends fitted into the slots in said bars and bent adjacent to said slots into engagement with the sides of the bars and solder for uniting said parts.

7. A winding for electrical machines, comprising conducting-bars having slotted ends and connectors having their ends bent into hook form and fitted into said slots.

8. In an electrical machine having a slotted core, conducting-bars located in the core-slots and having laterally-slotted ends and strap-connectors having their ends bent into hook form and fitted into the slots in the ends of the bars.

9. A winding for electrical machines comprising bars having slots in their ends which are located nearer to one side of the bars than the other, strap-connectors which project into the slots and partially surround the thicker adjacent portions and solder for fastening said parts together.

10. A winding for electrical machines comprising bar-conductors having slotted ends, strap-connectors projecting through said slots and bent into engagement with the adjacent sides of the bars and solder for fastening said parts together.

In testimony whereof I have hereunto subscribed my name this 6th day of April, 1903.

F. J. LINDEMAN.

Witnesses:
 Leo J. Miller,
 James B. Young.